United States Patent
Kilickiran et al.

(10) Patent No.: US 7,828,992 B2
(45) Date of Patent: Nov. 9, 2010

(54) COMPOSITION COMPRISING AT LEAST ONE TYPE OF LIQUID CRYSTAL

(75) Inventors: Pinar Kilickiran, Esslingen (DE); Anthony Roberts, Stuttgart (DE); Akira Masutani, Fellbach (DE); Gabriele Nelles, Stuttgart (DE); Akio Yasuda, Esslingen (DE)

(73) Assignee: Sony Deutschland GmbH, Berlin (DE)

( * ) Notice: Subject to any disclaimer, the term of this patent is extended or adjusted under 35 U.S.C. 154(b) by 566 days.

(21) Appl. No.: 11/560,082

(22) Filed: Nov. 15, 2006

(65) Prior Publication Data

US 2007/0228324 A1 Oct. 4, 2007

(30) Foreign Application Priority Data

Mar. 31, 2006 (EP) .................................. 06006898

(51) Int. Cl.
- *C09K 19/00* (2006.01)
- *C09K 19/06* (2006.01)
- *C09K 19/52* (2006.01)
- *G02F 1/03* (2006.01)

(52) U.S. Cl. .............................. 252/299.01; 252/299.1; 252/299.6; 428/20; 428/270.1; 430/1.1; 430/1.3

(58) Field of Classification Search ............ 252/299.01, 252/299.6, 299.1; 428/1.1, 1.3; 430/20, 430/270.1

See application file for complete search history.

(56) References Cited

U.S. PATENT DOCUMENTS

| | | | |
|---|---|---|---|
| 3,983,049 A | 9/1976 | Aftergut et al. | |
| 4,287,085 A | 9/1981 | Takei et al. | |
| 6,366,330 B1 | 4/2002 | Khan et al. | |
| 6,905,785 B2 * | 6/2005 | Noguchi et al. | 428/690 |
| 7,348,043 B2 * | 3/2008 | Fujita et al. | 428/1.1 |
| 7,514,128 B2 * | 4/2009 | Fujita et al. | 428/1.3 |
| 2003/0092930 A1 | 5/2003 | Schmidt et al. | |
| 2007/0228324 A1 | 10/2007 | Kilickiran et al. | |

FOREIGN PATENT DOCUMENTS

| | | |
|---|---|---|
| EP | 0 072 204 A1 | 2/1983 |
| EP | 1 439 215 A1 | 7/2004 |
| EP | 1 541 661 A1 | 6/2005 |
| WO | WO009901788AI * | 1/1999 |

OTHER PUBLICATIONS

U.S. Appl. No. 11/816,329, filed Aug. 15, 2007, Masutani, et al.
U.S. Appl. No. 12/295,476, filed Sep. 30, 2008, Kilickiran, et al.

* cited by examiner

*Primary Examiner*—Geraldina Visconti
(74) *Attorney, Agent, or Firm*—Oblon, Spivak, McClelland, Maier & Neustadt, L.L.P.

(57) ABSTRACT

The present invention relates to a composition comprising at least one type of liquid crystal, to a liquid crystal cell and liquid crystal display device comprising such composition and to a method of preparing such a composition and/or such a liquid crystal cell.

28 Claims, 24 Drawing Sheets

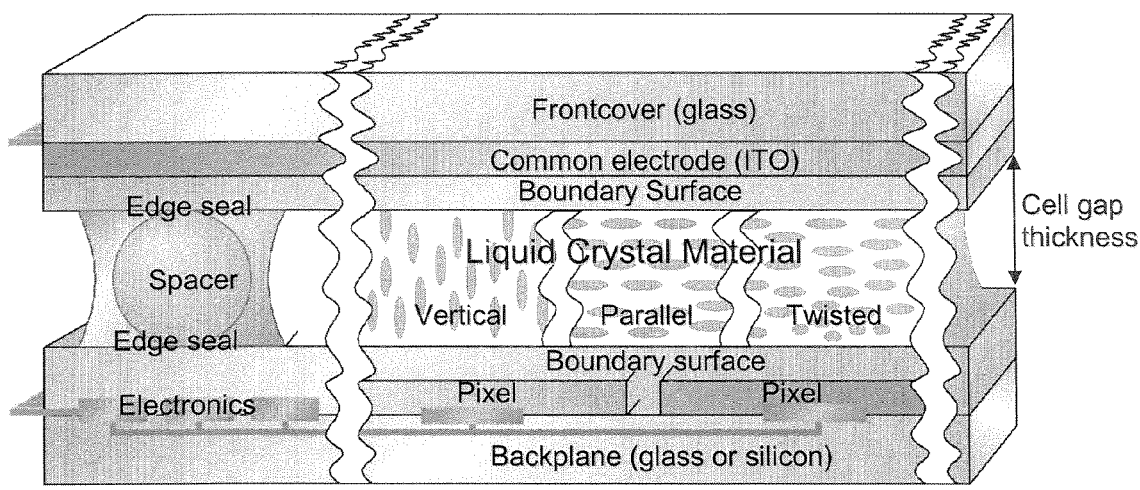
Figure 1. Schematic drawing of liquid crystal display device with example of vertical, parallel and twisted alignment texture.

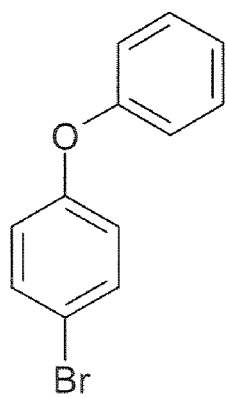 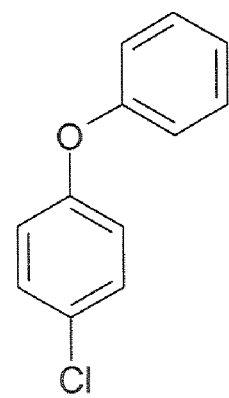
4-Bromodiphenylether
BrPhOPh
4-Chlorodiphenylether
ClPhOPh
Figure 2. Chemical structures of BrPhOPh and ClPhOPh Figure 21. Schematic diagram showing a clear effect of hysteresis reduction. The top figure shows transmittance-voltage curve of D-SPDLC refilled with dichroic liquid crystal (D-LC) without BrPhOPh. The bottom figure shows the one refilled with BrPhOPh doped D-LC.

Figure 22. Addition of both BrPhOPh and ClPhOPh in D-SPDLC shows reduction in hysteresis. The latter is more efficient in the hysteresis reduction.

Figure 23 Schematic diagram showing the definition of hysteresis

COMPOSITION COMPRISING AT LEAST ONE TYPE OF LIQUID CRYSTAL

The present invention relates to a composition comprising at least one type of liquid crystal, to a liquid crystal cell and liquid crystal display device comprising such composition and to a method of preparing such a composition and/or such a liquid crystal cell.

Current electronic device display technologies require displays with high brightness and contrast, low power consumption, and very fast response times. The state of the art liquid crystals used in such displays very often do not fulfill all these requirements. Numerous studies have been carried out towards this end wherein either new liquid crystal mixtures were developed or additives, such as inorganic micro- or nano-particles, organic hydrogen-bond or complex forming materials were admixed to the existing liquid crystals to improve their properties (Buchnev et al., 2005, Journal of the SID 13/9, EP 1 213 293, EP 1 038 941, EP 1 197 791 and EP 1 541 661). The additives reported so far do not fulfill all requirements, such as improving the response times without disturbing the contrast ratio, or reducing the switching voltage whilst the response speed is still kept high and the contrast ratio remains unchanged. Another important parameter is the voltage holding ratio of the liquid crystal cells which should be kept high, ideally higher than 95%. None of the prior art liquid crystal mixtures fulfill the requirement of achieving fast response times whilst, at the same time keeping the voltage holding ratio high.

Accordingly, it was an object of the present invention to provide for liquid crystal compositions allowing the production of liquid crystal cells wherein the response times are fast, the liquid crystal alignment at the boundary surfaces remain unchanged such that no changes are required in alignment layers, the off transmittance remains same, the contrast ratio and brightness remain high whilst, at the same time, the voltage holding ratios are kept high. It was also an object of the present invention to provide for a liquid crystal composition allowing the production of liquid crystal cells wherein a high brightness and contrast ratio, i.e. a high on-state transmittance and a low off-state transmittance is maintained.

The object is solved by a composition comprising at least one type of liquid crystal and at least one type of aromatic ether or diaromatic ether or aromatic thioether or diaromatic thioether or aromatic secondary amine or diaromatic secondary amine.

In one embodiment said aromatic ether or aromatic thioether or aromatic secondary amine or diaromatic ether or diaromatic thioether or diaromatic secondary amine is represented by formula I

$$Ar_1\text{—}(CH_2)_l\text{—}X\text{—}(CH_2)_k\text{—}Ar_2 \quad \text{formula I}$$

or by formula II

$$R\text{—}X\text{—}(CH_2)_i\text{—}Ar_1 \quad \text{formula II}$$

wherein X is O or S or NH, and each of $Ar_1$ and $Ar_2$ is an aromatic ring system, and l, k, i is 0 to 10, and wherein R is selected from the group comprising Cl, F, Br, I, OH, $NH_2$, —$(CH_2)_p CH_3$, wherein p is 0 to 22, preferably 0 to 10, —$CZ_q H_{3-q}$, wherein q is selected from 1 to 3 and Z is selected from Cl, F, Br, I, —$CF_3$, —CN, —$NO_2$, —COOH, cyclohexyl, cyclopentadienyl, cyclopentyl and carboxylic acid ester, wherein, optionally, in the —$(CH_2)_l$, —$(CH_2)_k$, —$(CH_2)_i$— group of formula I and II, one or several H may be substituted, preferably by halogen, hydroxyl, —CN, —$CF_3$, —$NO_2$, or —COOH and wherein, optionally, if R is the —$(CH_2)_p CH_3$ group in formula II, one or several H in the —$(CH_2)_p CH_3$ group may be substituted, preferably by halogen, hydroxyl, —CN, —$CF_3$, —$NO_2$, or —COOH.

Preferably, each of $Ar_1$ and $Ar_2$ is an aromatic ring system and is, at each occurrence, independently selected from the group comprising phenyl, naphthyl, biphenyl, binaphthyl, anthracenyl, triptycyl, and heteroaromatic rings, with one or several heteroatoms in them, selected from S, O and N such as pyridyl, pyrimidyl, pyridazyl, thienyl and furanyl.

Preferably, each of $Ar_1$ and $Ar_2$, independently, is an aromatic ring system which is unsubstituted or is substituted with one or several substituents.

More preferably said one or several substituents is selected from the group comprising Cl, F, Br, I, OH, $NH_2$, —$O(CH_2)_n CH_3$, —$(CH_2)_n CH_3$, wherein n is 0 to 22, preferably 0 to 10, —$CY_m H_{3-m}$, wherein Y is selected from Cl, F, Br and I, m is from 1 to 3, said one or several substituents being preferably selected from —$CF_3$, —CN, —$NO_2$, —COOH, carboxylic acid ester, substituted and unsubstituted cyclohexyl, substituted and unsubstituted cyclohexenyl, substituted and unsubstituted cyclopentadienyl, substituted and unsubstituted cyclopentyl.

In one embodiment one of $Ar_1$ and $Ar_2$ is substituted with one or several substituents, preferably as defined in claim 5, and the other one of $Ar_1$ and $Ar_2$ is not substituted, wherein, preferably, said diaromatic ether is selected from the group comprising 4-chlorodiphenylether, 4-bromodiphenylether and 4-fluorobiphenylether.

In another embodiment both of $Ar_1$ and $Ar_2$ are substituted with one or several substituents, preferably as defined above.

In yet another embodiment, none of $Ar_1$ and $Ar_2$ are substituted.

In one embodiment the amount of said at least one type of aromatic ether or diaromatic ether or aromatic thioether or diaromatic thioether or aromatic secondary amine or diaromatic secondary amine is, with respect to the total weight of the composition, 0.05% (w/w) to 20% (w/w), preferably 0.1% (w/w) to 10% (w/w).

In one embodiment said at least one type of liquid crystal is a liquid crystalline compound or a mixture of liquid crystalline compounds of the negative type.

In another embodiment said at least one type of liquid crystal is a liquid crystalline compound or a mixture of liquid crystalline compounds of the positive type.

In yet another embodiment, said at least one type of liquid crystal is a liquid crystalline compound or a mixture of liquid crystalline compounds of the dual-frequency type.

In one embodiment said at least one type of liquid crystal is a liquid crystalline compound or a mixture of liquid crystalline and non-liquid crystalline compounds where the liquid crystalline compound is preferably selected from nematic liquid crystals.

The objects of the present invention are also solved by a liquid crystal cell comprising the composition according to the present invention.

Preferably, the liquid crystal cell according to the present invention comprises a front- and a backplane, on each or either of said front- and backplane an electrode or multiplicity of electrodes, on each of said electrodes and/or on said front- and backplane, a boundary surface consisting of either the electrode and/or the front- and backplane, or consisting of an additional layer or layers of materials on said electrode and/or on said front- and backplane, and between said boundary surfaces said composition according to the present invention.

In one embodiment the liquid crystal cell according to the present invention has a response time <40 ms, preferably <20 ms, more preferably <10 ms, and/or a voltage holding ratio >80%, more preferably >90%, more preferably >96%.

In another embodiment the liquid crystal cell according to the present invention is a polymer dispersed liquid crystal (PDLC), dichroic polymer dispersed liquid crystal (D-PDLC), sponge polymer dispersed liquid crystal (SP-DLC), dichroic sponge polymer dispersed liquid crystal cell (D-SPDLC), wherein the composition according to the present invention has been used to prepare said cell, wherein, preferably, it has a hysteresis $\Delta V<0.1 \times V_{90}$, more preferably $<0.05 \times V_{90}$, more preferably $<0.01 \times V_{90}$, wherein $V_{90}$ is a switching voltage at which $T_{90}$, i.e. 90% of maximum transmission, is achieved, wherein the hysteresis $\Delta V$ is defined as the difference in voltage between the voltage value at half maximum transmission, $T_{50}$, of said cell when the voltage is increasing and the voltage value at half maximum transmission, $T_{50}$, of said cell when the voltage is decreasing, on a transmission vs. voltage graph, wherein $T_{50}$ is defined as ½ $(T_{max}+T_{min})$, wherein $T_{max}$ and $T_{min}$ are the maximum and minimum transmission achieved on said transmission vs. voltage graph.

The objects of the present invention are also solved by a liquid crystal display device, comprising the composition according to the present invention or comprising one or a multiplicity of interconnected or separate liquid crystal cells according to the present invention.

The objects of the present invention are also solved by a method of preparing the composition according to the present invention, characterized in that at least one aromatic ether or diaromatic ether or aromatic thioether or diaromatic thioether or aromatic secondary amine or diaromatic secondary amine as defined above, is mixed with at least one type of liquid crystal as defined above.

The objects of the present invention are also solved by a method of preparing the liquid crystal cell according to the present invention, characterized in that the composition according to the present invention is used to fill a liquid crystal cell or D-SPDLC or SPDLC or D-PDLC or PDLC.

As used herein, the terms "diaromatic ether" and "diaromatic thioether" and diaromatic secondary amine refer to compounds which, in their molecular structure, contain two aromatic ring systems which are linked to each other by an oxygen atom in the case of "ether", or by a sulfur atom in the case of a "thioether", or by a nitrogen in the case of a secondary amine. Such linkage may be direct, in the sense that the oxygen atom or the sulfur atom or the nitrogen atom is the only atom separating the two aromatic groups, or the linkage may be via an alkyl bridge on either or both sides of the oxygen atom or sulfur atom or nitrogen atom. In this case, one aromatic ring system is linked to the oxygen atom or sulfur atom or nitrogen atom via an alkyl bridge, and the oxygen atom or sulfur atom or nitrogen atom, in turn, is linked to the other aromatic ring system, either with no further group in between or with an additional alkyl bridge as well. The aforementioned alkyl bridges may be substituted or unsubstituted.

As used herein, the terms "aromatic ether" and "aromatic thioether" and aromatic secondary amine refer to compounds which, in their molecular structure, contain one aromatic ring system which is linked to an organic rest R via an oxygen atom in the case of "ether", or via a sulfur atom in the case of a "thioether", or by a nitrogen in the case of a secondary amine. The organic rest R is preferably selected from the group comprising Cl, F, Br, I, OH, $NH_2$, —$(CH_2)_pCH_3$, wherein p is 0 to 22, preferably 0 to 10, —$CZ_qH_{3-q}$, wherein q is selected from 1 to 3 and Z is selected from Cl, F, Br, I, —$CF_3$, —CN, —$NO_2$, —COOH, cyclohexyl, cyclopentadienyl, cyclopentyl and carboxylic acid ester, wherein, optionally, in the —$(CH_2)_l$—, —$(CH_2)_k$—, —$(CH_2)_i$— group of formula I and II, one or several H may be substituted, preferably by halogen, hydroxyl, —CN, —$CF_3$, —$NO_2$, or —COOH and wherein, optionally, if R is the —$(CH_2)_p CH_3$ group in formula II, one or several H in the —$(CH_2)_p CH_3$ group may be substituted, preferably by halogen, hydroxyl, —CN, —$CF_3$, —$NO_2$, or —COOH.

Aromatic ring systems useful in accordance with the present invention are for example, without being limited thereto, phenyl, naphthyl, biphenyl, binaphthyl, anthracenyl, triptycyl, and heteroaromatic rings having one or several heteroatoms in them (S, O or N) such as pyridyl, pyrimidyl, pyridazyl, pyridinyl, furyl, thienyl.

The term "substituted", as used herein is meant to refer to one or several of the hydrogen atoms present on an aromatic ring system or an aliphatic system being exchanged for another atom or group of atoms. Examples of suitable substituents are, without being limited thereto Cl, F, Br, I, OH, $NH_2$, —$O(CH_2)_nCH_3$, —$(CH_2)_nCH_3$, wherein n is 0 to 22, preferably 0 to 10, —$CY_mH_{3-m}$, wherein Y is selected from Cl, F, Br and I, m is from 1 to 3, said one or several substituents being preferably selected from —$CF_3$, —CN, —$NO_2$, —COOH, carboxylic acid ester, cyclohexyl, cyclohexenyl, cyclopentadienyl, cyclopentyl.

The terms "positive type" and "negative type" when used in connection with a liquid crystal compound is meant to refer to the behavior of such a compound in a liquid crystal cell at a particular range of electric field driving frequencies. Liquid crystal compounds of the negative type means that the liquid crystal posses negative dielectric anisotropy at a given range of drive frequencies. They are most commonly orientated in such a manner within a liquid crystal cell when no external field is applied such that they align perpendicular to the boundary surfaces surrounding the liquid crystalline material. This type of alignment is also called homeotropic alignment. Liquid crystal compounds of the positive type means that the liquid crystal posses positive dielectric anisotropy at a given range of drive frequencies. They are most commonly orientated within a liquid crystal cell such that they are aligned parallel to the surrounding boundary surfaces when no external field is applied. This type of alignment is also called homogenous alignment in that the general alignment direction of the liquid crystal is parallel to the surrounding bounding surfaces. There is liquid crystal that can possess both positive and negative dielectric anisotropy depending on the range of drive frequencies. Such liquid crystals are called dual-frequency liquid crystal, and can be used in either homeotropic or homogeneous alignment.

The term "response time", as used herein, refers to the time required for a liquid crystal cell to align with a change in applied field. This is usually defined as the time from when the field is changed to the time when the transmission changes by 90% of the overall change. The 90% value is chosen because the gradient of the change in transmission is sufficiently different to zero, which is the not-measurable flat-line case when the transmission has changed fully by 100% of the desired transmission. Turn-on or Rise time is usually taken to be the time taken to respond to an increase in absolute magnitude of an applied field, whereas Turn-off or Fall or Decay time is usually taken to be the time taken to respond to a decrease in absolute magnitude of applied field. This can also be seen from FIG. 24.

The term "voltage holding ratio", as used herein, is meant to refer to the ratio between the electric charge stored on the cell integrated over a certain time (e.g. 16 ms) versus the electric charge stored on an ideal capacitor. It is a measure of the current leakage through the liquid crystal. The voltage holding ratio can be measured by observing the drop in voltage across the cell over a certain time; if a cell holds the voltage at a constant level then the voltage holding ratio is high. High voltage holding ratios equate to low current leakage, high voltage holding ratios are essential for displays with long lifetime and low levels of optical flicker.

Polymer dispersed liquid crystal cells (PDLCs), dichroic polymer dispersed liquid crystal cells (DPDLCs), sponge polymer dispersed liquid crystal cells (SPDLCs) and dichroic sponge polymer dispersed liquid crystal cells (D-SPDLC) are known to someone skilled in the art and have for example been described in terms of their structure and process of manufacture in EP01129709, EP 02793010 and EP 02791826. The content of EP01129709, EP 02793010 and EP 02791826 is incorporated herein in its entirety by reference thereto. In such PDLCs, DPDLCs, SPDLCs, and D-SPDLC, in a transmission vs. voltage curve, usually a hysteresis can be observed that is, when the voltage is increased, the transmission follows a sigmoidal curve, and upon reduction of the voltage of the same cell again, the transmission again follows a sigmoidal curve which, however, is slightly shifted from the sigmoidal curve for increasing voltage. This phenomenon is termed "hysteresis". In a more specific sense, the term "hysteresis", as used herein in combination with a PDLC, DPDLC, SPDLC or D-SPDLC is defined as the difference in voltage between the voltage value at half maximum transmission, $T_{50}$, of said cell when the voltage is increasing and the voltage value at half maximum transmission, $T_{50}$, of said cell when the voltage is decreasing, on a transmission vs. voltage graph wherein $T_{50}$ is defined as ½ $(T_{max}+T_{min})$, wherein $T_{max}$ and $T_{min}$ are the maximum and minimum transmission achieved on said transmission vs. voltage graph.

A cell is a method of confining the liquid crystal mixture such that fields can be applied to the mixture. A display device consists of one or more interconnected or separate cells.

The terms "E10" and "E90" refer to the electric fields applied to the cell for which 10% and 90% of the maximum optical transmission are respectively achieved. The term "V10" and "V90" refer to the respective voltage values at which 10% and 90% of the maximum transmission are achieved, respectively.

The term "speed factor", as used herein, is meant to designate a normalized measure of the response time of the liquid crystal to an increase in the applied field. Speed factors are calculated such that they allow for objective comparisons between materials measured in cells with $$k_{E \neq 0} \approx \frac{\Delta \varepsilon}{\gamma}$$

$$\frac{1}{\tau_{rise}} \approx k_{E \neq 0} E^2 - k_{E \neq 0} E_0^2$$

$$E_0^2 = \frac{\pi}{d} \sqrt{K}$$

$k_{E \neq 0}$ = Speed factor $\gamma$ = Viscosity $\Delta \varepsilon$ = Dielectric Anisotropy = Delta $E$ $E$ = Applied electric field $E_0$ = Threshold electric field $K$ = Elastic constants $d$ = Cell gap thickness different cell gap dimensions and also with different voltages applied. The speed factors are calculated by finding the gradient of the line of best fit of the reciprocal of response times versus the electric field squared using least squares regression.

The term "order parameter", as used herein, is a measure of the orientational ordering of the liquid crystal molecules with respect to each other. If the "director" is defined as the average direction along which the liquid crystal molecules tend to point, then the order parameter is a quantification of the likelihood and amount of ordering of a liquid crystal molecule with this director. In an ideal anisotropic crystal the order parameter is 1, in an ideal isotropic liquid the order parameter is 0. In typical liquid crystals the order parameter is between 0.3 and 0.8, and is a function of temperature.

$$S = \frac{3\langle \cos^2 \theta - 1 \rangle}{2}$$

$S$ = Order parameter $\theta$ = Angle between director and long axis of each molecule $\langle \rangle$ = Average over all molecules in sample The term "dichroic ratio", as used herein, is meant to refer to the normalized reduced ratio between the optical absorption of a dichroic dye dissolved in a liquid crystal mixture when the dye & liquid crystal is aligned perpendicularly versus when it is aligned parallelly to the plane of propagation of light through the mixture.

$$R = \frac{\alpha_\perp}{\alpha_\parallel}$$

$R$ = Dichroic Ratio $\alpha_\perp$ = Perpendicular optical extinction coefficient $\alpha_\parallel$ = Parallel optical extinction coefficient The present inventors have surprisingly found that by including in a liquid crystal composition at least one type of aromatic ether or diaromatic ether or aromatic thioether or diaromatic thioether or aromatic secondary amine or diaromatic secondary amine, it is possible to improve the response times of a liquid crystal cell substantially in comparison to a liquid crystal cell which comprises a liquid crystal composition that does not contain any dopant aromatic ether or diaromatic ether or aromatic thioether or diaromatic thioether or aromatic secondary amine or diaromatic secondary amine. The addition of such compounds to a liquid crystal composition results in reduced switching voltages and faster response times to applied electrical fields. Without wishing to be bound by any theory, the present inventors believe that the observed effect is due to a reduced viscosity and/or an increased dielectric anisotropy. With their non-planar structures and anisotropic behaviors, the dopant aromatic ether and diaromatic ether and aromatic thioether and diaromatic thioether and aromatic secondary amine and diaromatic secondary amine are believed to reduce the rotational viscosity of the liquid crystal mixtures and increase their dielectric anisotropies. The result is decreased, i.e. faster, response times in response to applied electrical fields. The aromatic ether and diaromatic ether and aromatic thioether and diaromatic thioether and aromatic secondary amine and diaromatic secondary amine according to the present invention do not cause any change in the off-state transmittance, especially of the liquid crystals of the negative type. This means that the contrast ratio is unchanged, thus the characteristics and nature of the alignment layers does not have to be redesigned. Likewise, the voltage holding ratios of the resulting mixtures remain >96%. Moreover, the dopant aromatic ether and diaromatic ether and aromatic thioether and diaromatic thioether and aromatic secondary amine and diaromatic secondary amine are non-volatile at filling temperatures and pressures and also at the operation temperatures of liquid crystal display devices. Moreover, the dopant molecules have very low conductivities which make them particularly suitable for use in such liquid crystal compositions.

In the following, reference is made to the figures, wherein

FIG. 1 shows a schematic representation of a typical liquid crystal test cell. The liquid crystal test cell depicted shows three possible orientations of the liquid crystal material contained therein. The representation is not meant to imply that a liquid crystal material may take a vertical (homeotropic), parallel (homogeneous) and twisted orientation at the same time. The boundary surfaces shown therein may be a special layer introduced for the very purpose of aligning the liquid crystal material that is in contact with such boundary surface. Examples of useful boundary surfaces in accordance with the present invention are rubbed/unrubbed ITO, rubbed/unrubbed polyimide, rubbed/unrubbed CTAB (cetyl trimethyl ammonium bromide), or obliquely/perpendicularly evaporated/sputtered SiOx. The cell is formed of a front plane and a backplane. At each of these planes there is an electrode, frequently formed by ITO, and on top of such electrode there is a boundary surface which, optionally, may be an additional layer or layers, or may be the surfaces of the electrodes themselves.

FIG. 2 shows two structures of example dopants in accordance with the present invention. The term "dopant" as used herein is meant to signify a compound that is added to a liquid crystal composition. In a more specific sense, the term "dopant" refers to the aromatic ether or diaromatic ether or aromatic thioether or diaromatic thioether or aromatic secondary amine or diaromatic secondary amine in accordance with the present invention.

FIG. 3 shows the rise time vs. average field strength (from E10 to E90) for 2%, 4% and 6% BrPhOPh doped negative liquid crystals. Measurements were carried out at 35° C.

FIG. 4 shows temperature dependent speed factors for 4% and 6% BrPhOPh doped negative liquid crystals. Measurements were carried out at 52, 55, 60, 65 and 70° C. 2 μm cells with $SiO_x$ alignment layers. 4% & 6% doped mixtures are faster and their switching voltages are lower than the pure material.

FIG. 5 shows rise time vs. averaged field strength (from E10 to E90) for 10% BrPhOPh doped negative liquid crystals. Measurements were carried out at 35° C. 10% doped material is faster and its switching voltages are lower.

FIG. 6 shows decay time vs. applied voltage (from V10 to V90) for 0, 1, 2% & 4% BrPhOPh doped negative liquid crystals. Measurements were carried out at 35° C. There is no significant change in the decay times.

FIG. 7 shows response time improvements at different concentrations of BrPhOPh (10%, 6%, 4% and 2%) in negative liquid crystals, 5 μm thick cells at 35° C. Depending on the applied voltages and the amount of dopants used, response times are from 5% to more than 80% faster than the pure materials.

FIG. 8 shows off transmittance of the negative liquid crystalline material with and without BrPhOPh (1%, 2%, 4% and 6% concentrations). Measurements were carried out at 35° C. No change in the black level. Thus the liquid crystal's director orientation at the alignment layer (boundary surface) remains unaffected FIG. 9 shows Voltage-Transmittance diagram of 4% and 6% BrPhOPh doped negative liquid crystal. 2 μm thick cells with $SiO_x$ alignment layer. Measurements were carried out at 50° C. Contrast ratio and brightness of the doped mixtures are as good as the pure material.

Figure 12:
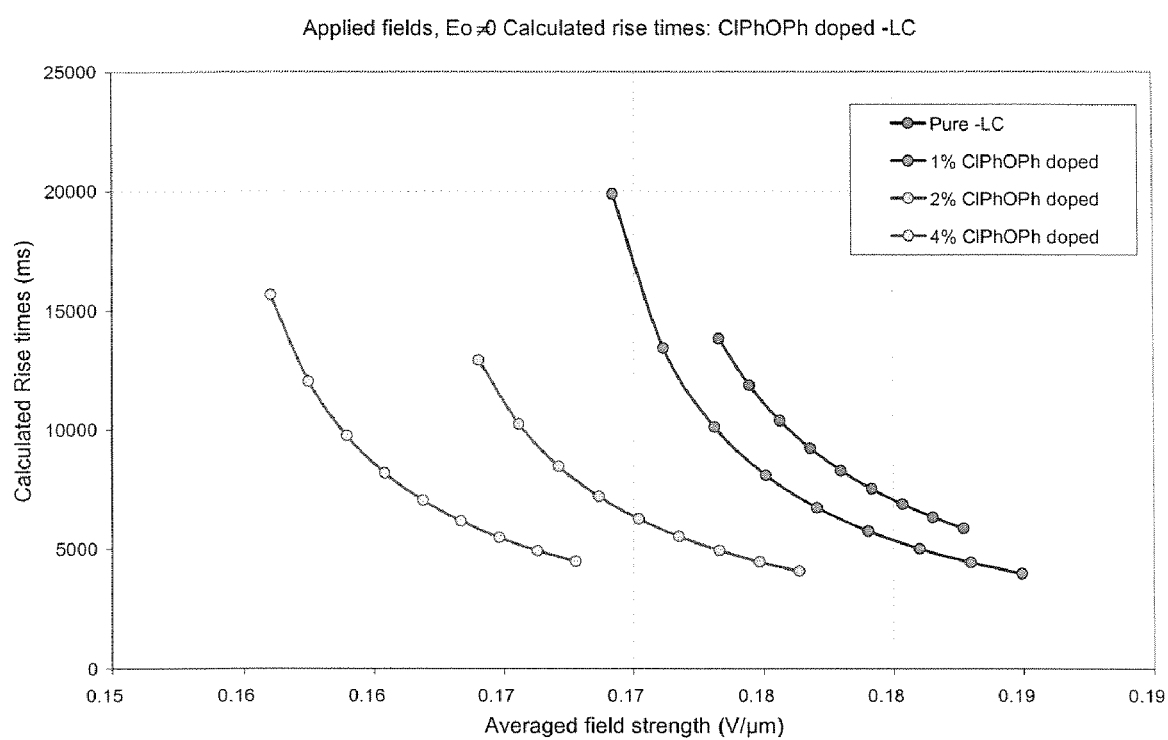

FIG. 12 shows rise time vs. averaged field strength (from E10 to E90) for 1%, 2% and 4% ClPhOPh doped negative liquid crystals. Measurements were carried out at 35° C. Doped mixtures are much faster, and the switching voltages are reduced.

Figure 13:
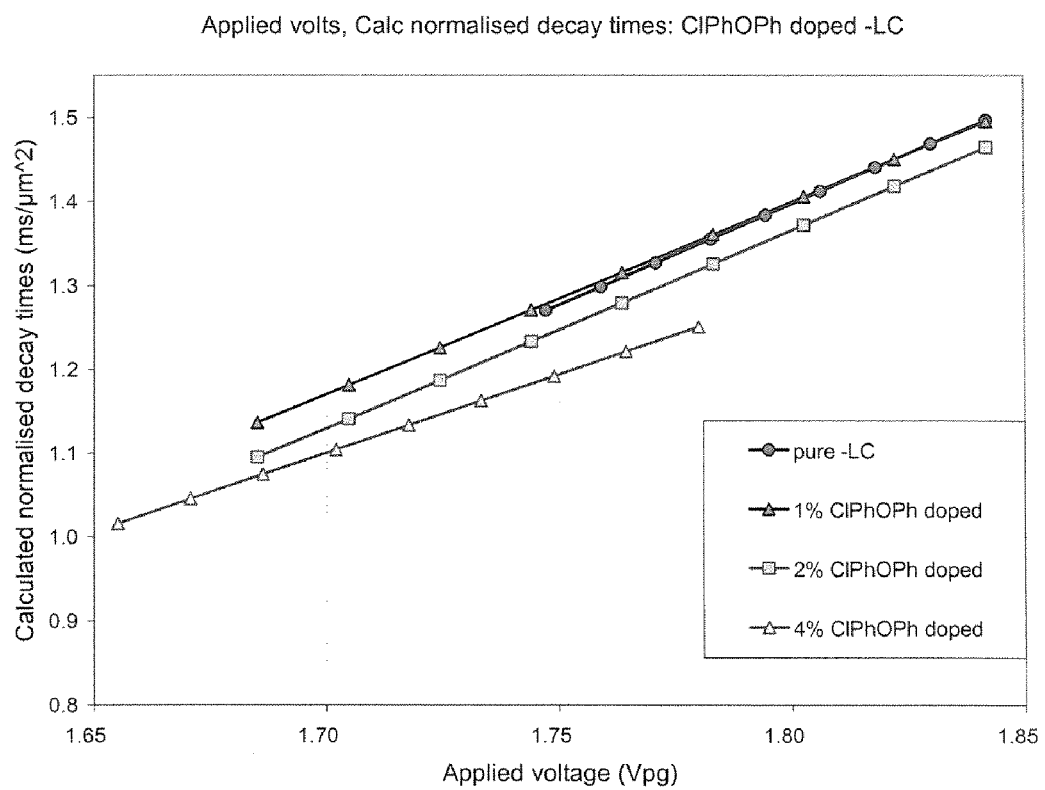

FIG. 13 shows decay time vs. applied voltage (from V10 to V90) for 1%, 2% and 4% ClPhOPh doped negative liquid crystals. Measurements were carried out at 35° C. Decay time of the 1% doped mixture is almost the same as that of pure material. Decay times of 2% & 4% doped mixtures are faster than the pure material.

Figure 14:
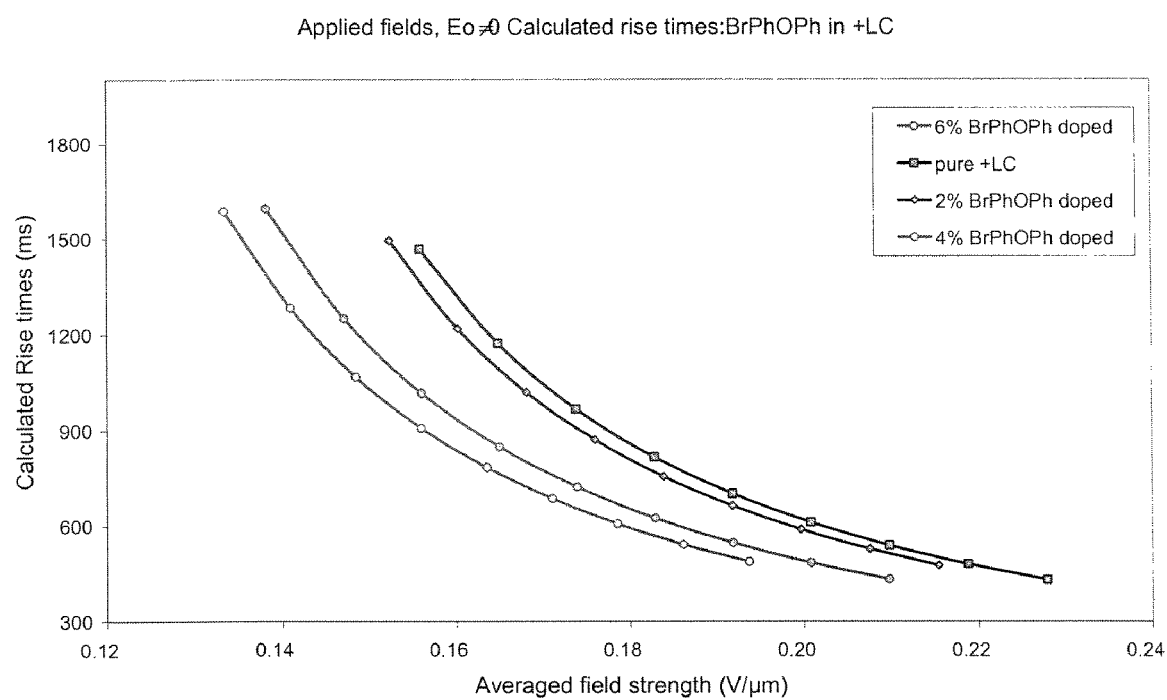

FIG. 14 shows response time improvements upon addition of 2%, 4% & 6% BrPhOPh to positive type liquid crystals. Measurements were carried out at 35° C. Rise time of the doped mixtures are faster.

Figure 15:
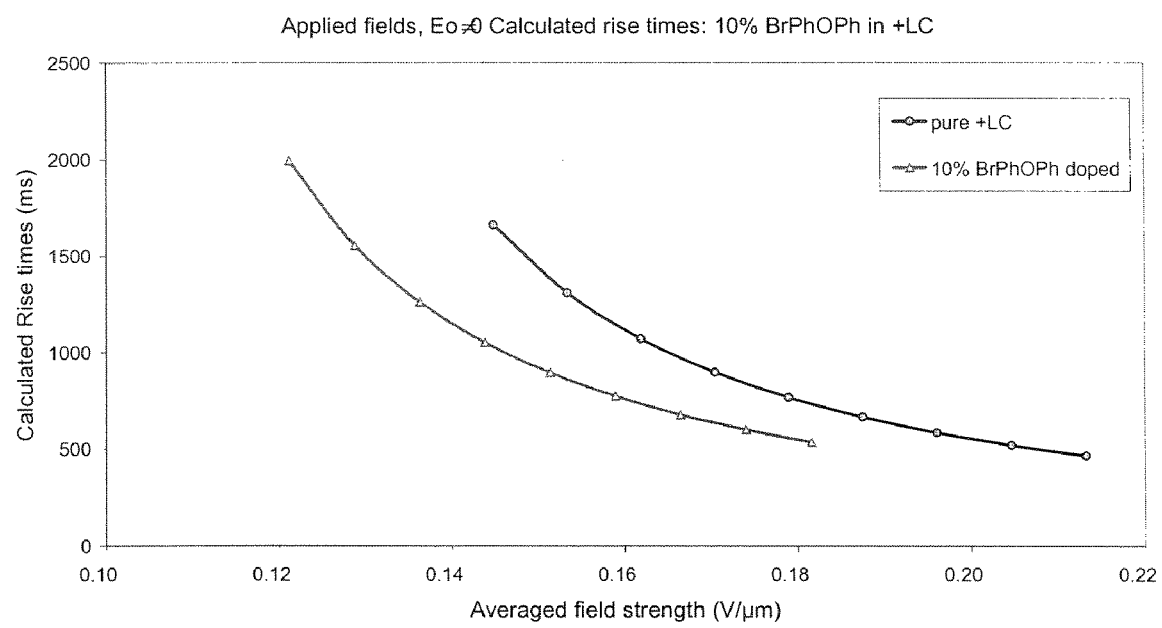

FIG. 15 shows rise time vs. averaged field strength (from E10 to E90) for 10% BrPhOPh doped positive liquid crystals. Measurements were carried out at 35° C. Rise time of the 10% doped mixture is faster. Also, its switching voltage is lower.

Figure 16:
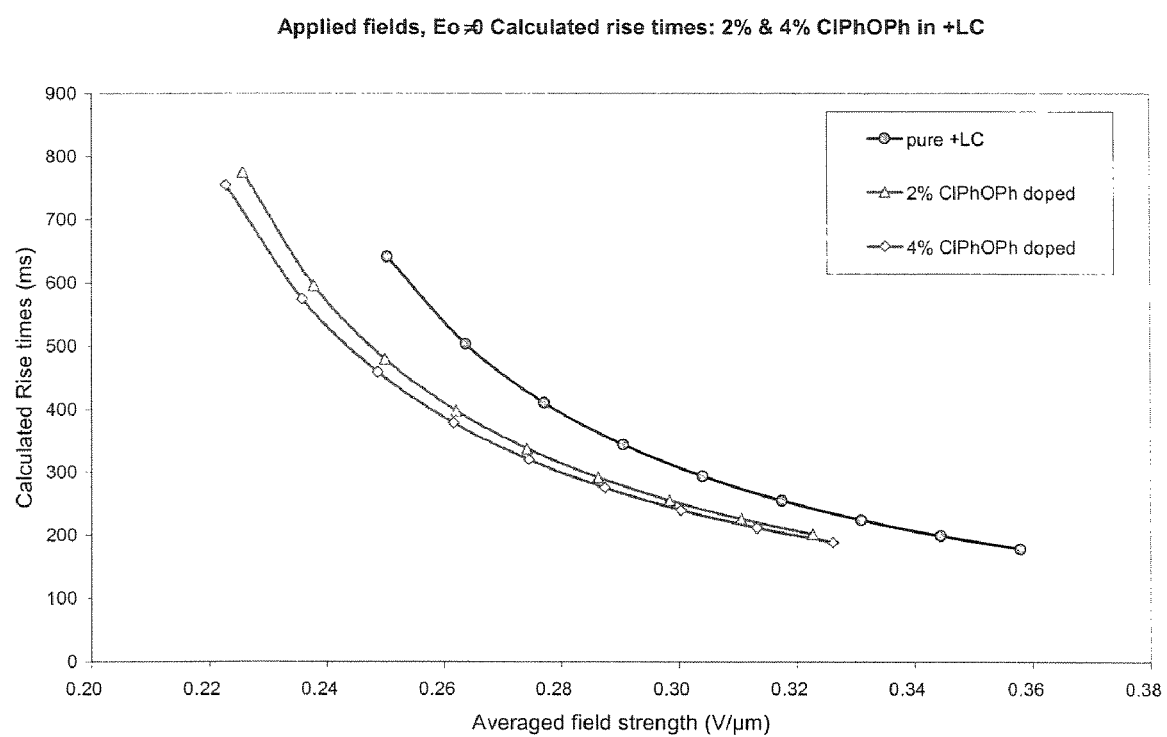

FIG. 16 shows rise time vs. averaged field strength (from E10 to E90) for 2% and 4% ClPhOPh doped positive liquid crystals. Measurements were carried out at 35° C. Rise time of the doped mixtures are faster, and the switching voltages are lower.

Figure 17:
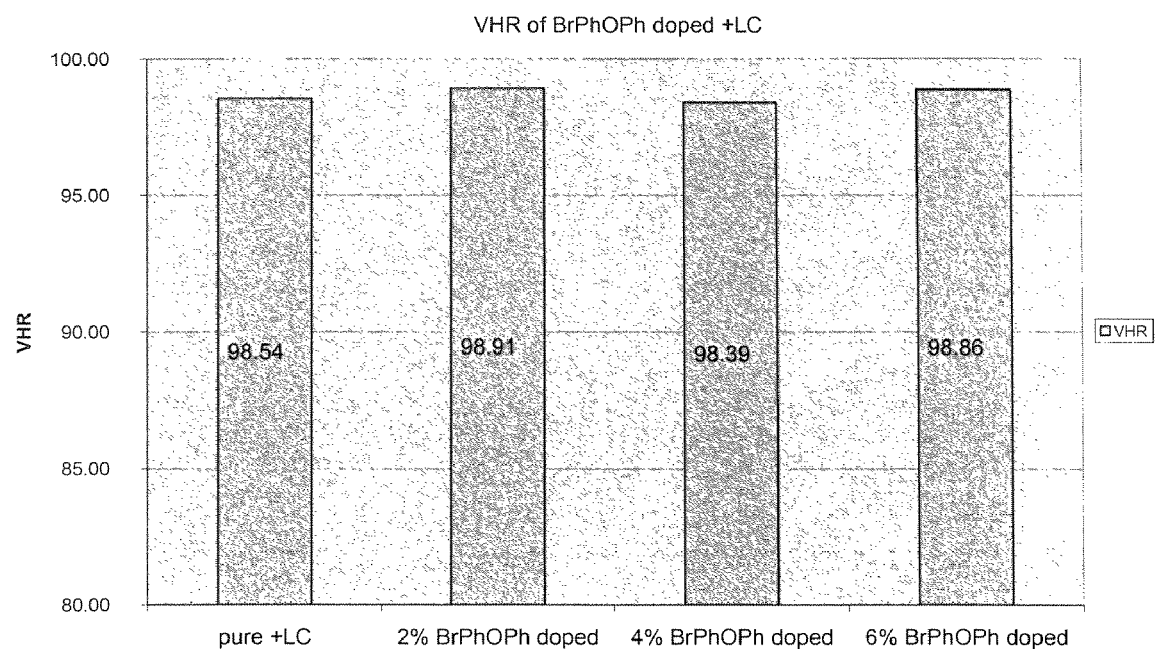

FIG. 17 shows voltage holding ratios of 2%, 4% and 6% BrPhOPh doped positive liquid crystal. Measurements were carried out at 35° C. Voltage holding ratios remain unaffected and very high after doping.

Figure 18:
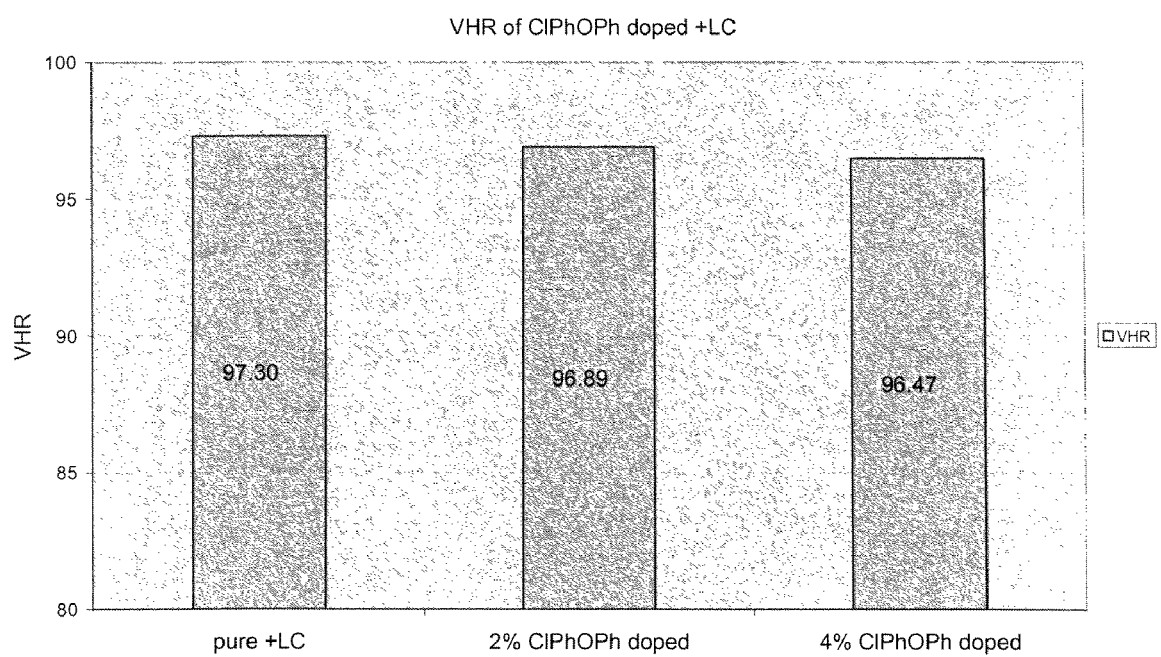

FIG. 18 shows voltage holding ratios of 2% and 4% ClPhOPh doped positive liquid crystals. Measurements were carried out at 35° C. Voltage holding ratios remain unaffected and very high after doping.

Figure 19:
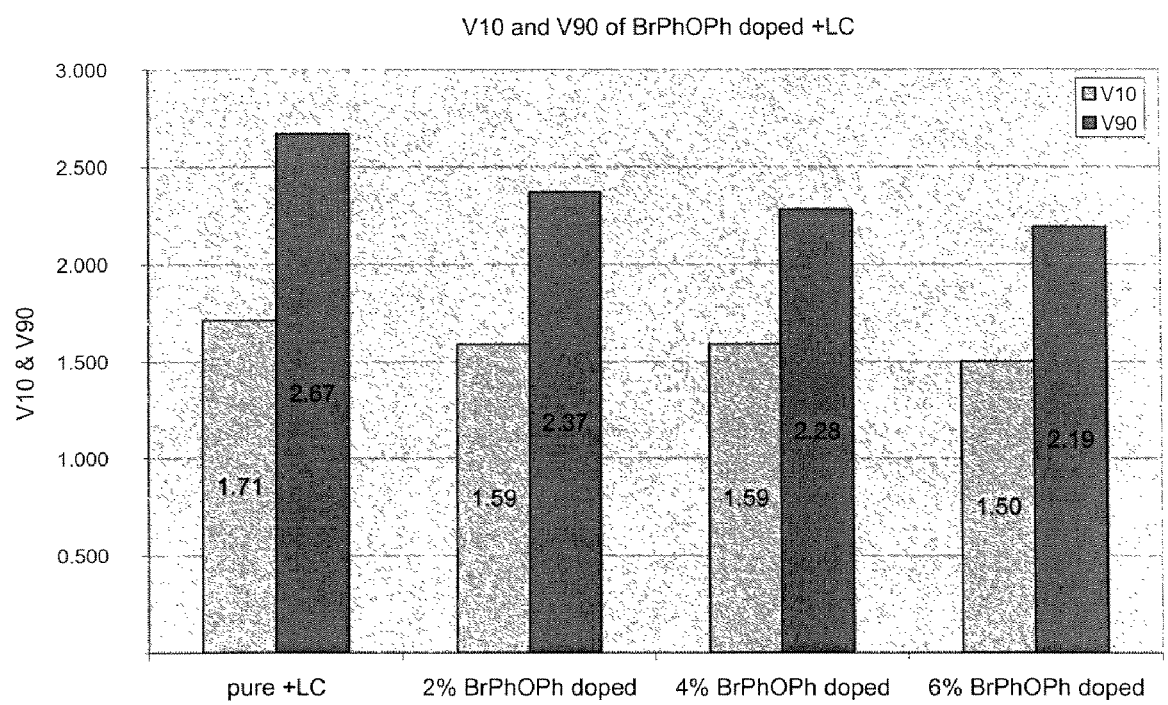

FIG. 19 shows V10 and V90 values of 2%, 4% and 6% BrPhOPh doped positive liquid crystal. Switching voltages decrease upon doping.

Figure 20:
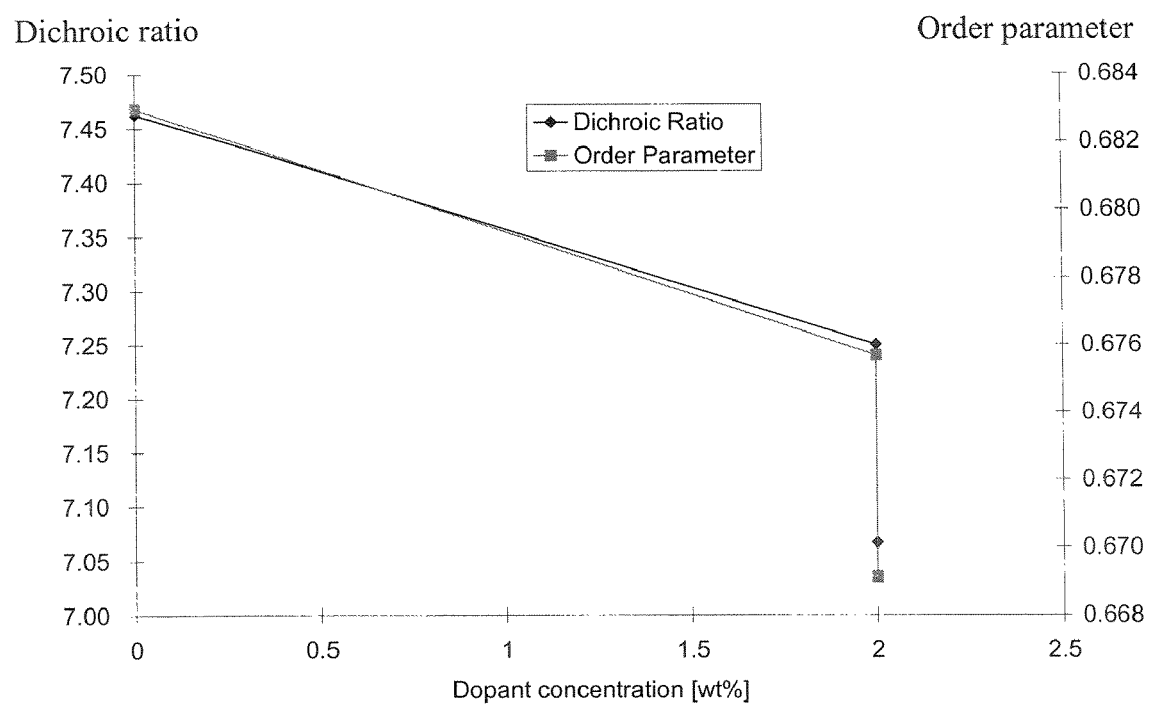

FIG. 20 shows order parameters and dichroic ratios of BrPhOPh doped+LC.

Figure 21:
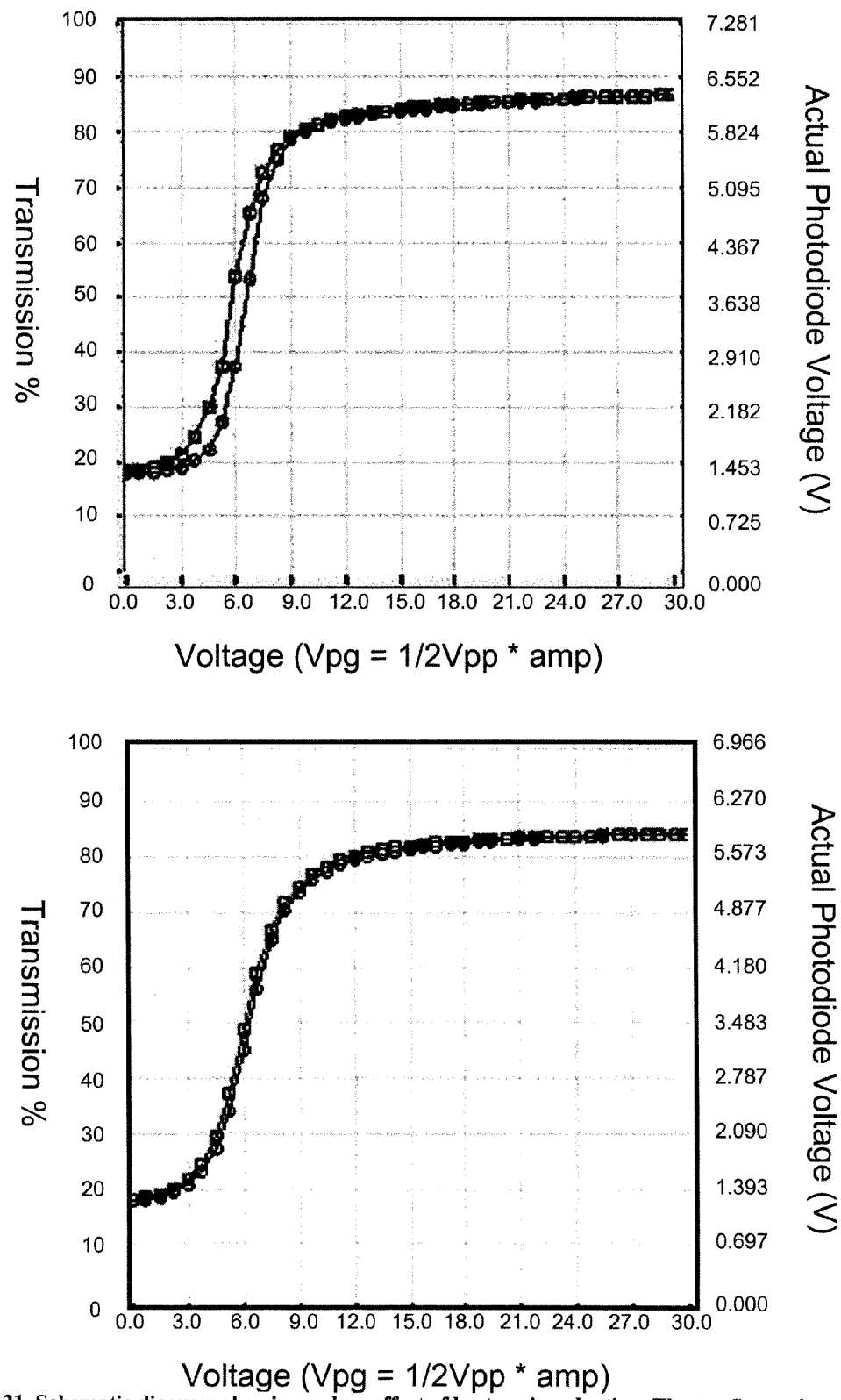

FIG. 21 shows a transmission vs. voltage T-V curve of undoped D-SPDLC (top) and D-SPDLC doped with 5 wt % BrPhOPh (bottom). Reduction of hysteresis can be clearly seen with the doped system.

Figure 22:
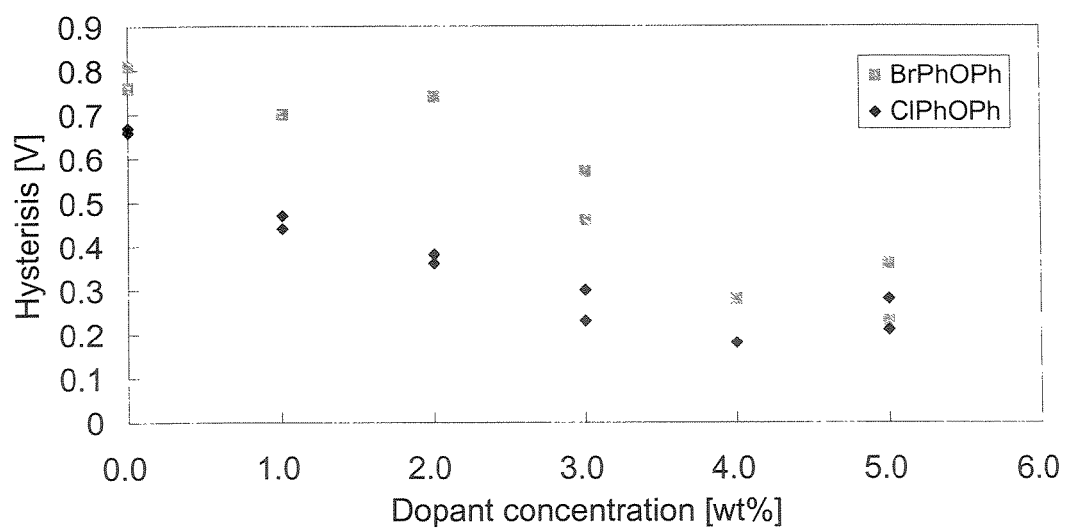

FIG. 22 shows a hysteresis reduction with BrPhOPh and ClPhOPh. Both dopants reduce the D-SPDLC's hysteresis. Compared to BrPhOPh, a smaller amount of ClPhOPh is needed to achieve the same hysteresis reduction.

Figure 23:
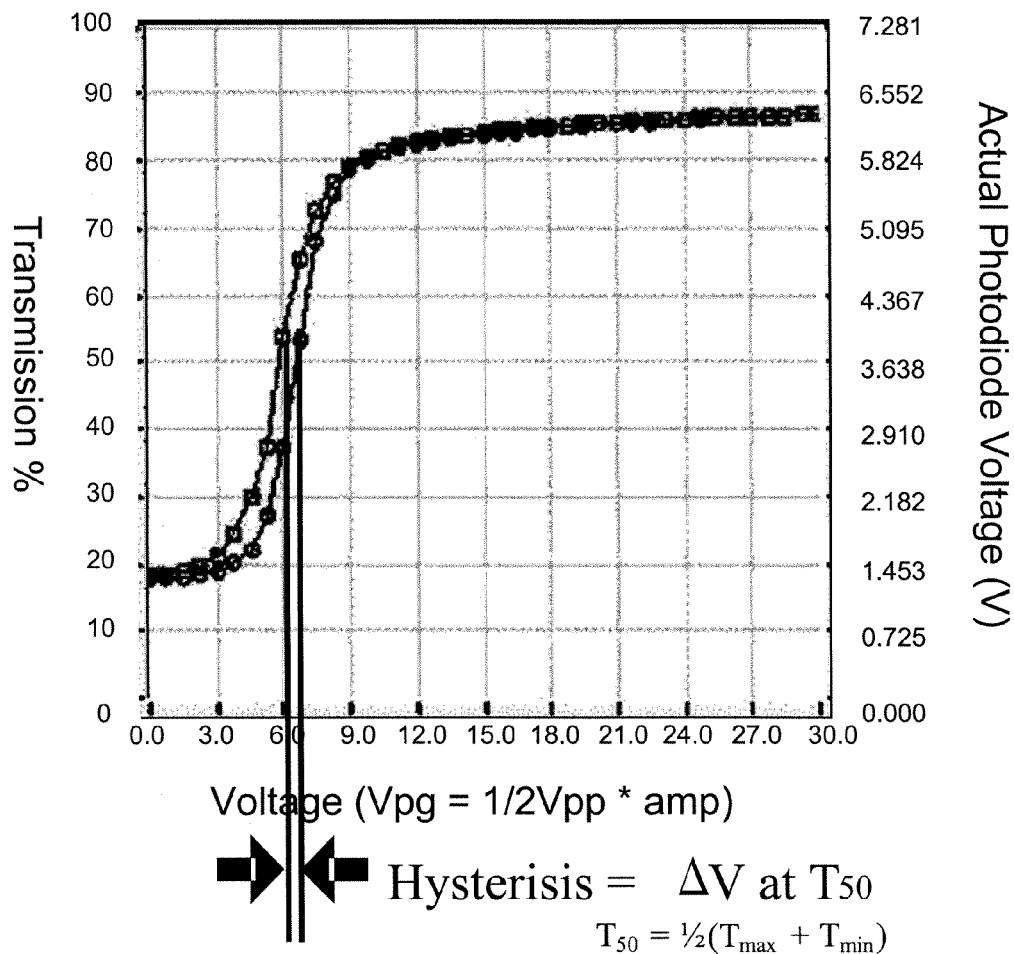
Figure 24:
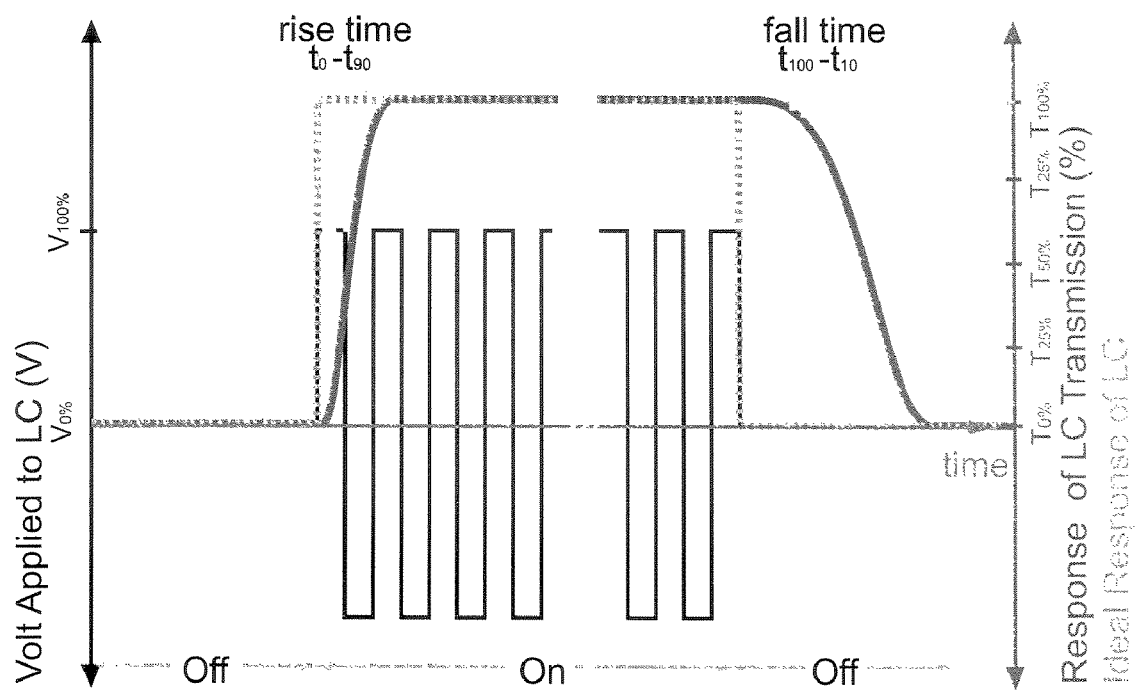

FIG. 23 shows hysteresis being defined as "voltage value for Transmission$_{50}$ when the voltage is increasing" minus "voltage value for Transmission$_{50}$ when the voltage is decreasing", and FIG. 24 shows a schematic graph summarizing an illustrative representation of turn-on (rise) and turn-off (decay or fall) response times.

Moreover, reference is made to the following examples which are given to illustrate, not to limit the present invention:

EXAMPLES

Example 1

1 to 10 weight % of 4-bromodiphenylether was mixed with negative type liquid crystals and stirred at 60° C. for an hour. The mixtures were capillary filled in 5 µm cell gap, vertically aligned test cells (see FIG. 1 for general schematic representation of a liquid crystal cell). The filled test cells were annealed in an oven for 2 hours at 5° C.-10° C. lower temperatures than the nematic-isotropic transition temperatures of the liquid crystals. The test cells were allowed to cool gradually to room temperature ~22° C. Then the response and transmittance profiles were measured at 35° C. using an optical microscope and drive and measurement hardware and software.

In another experiment, the above-described mixtures were filled in a vacuum oven to liquid crystal panels with SiO$_X$ alignment layer (homeotropic alignment, 2 µm cell gap). Response time and transmittance measurements were carried out at temperatures between 35 to 70° C.

Finally the mixtures were also filled in 10 µm cell gap, vertically aligned and in 20 µm cell gap, antiparallel test cells. These test cells were used to measure the capacitance, dielectric anisotropy and rotational viscosities of the mixtures.

Figure 3:
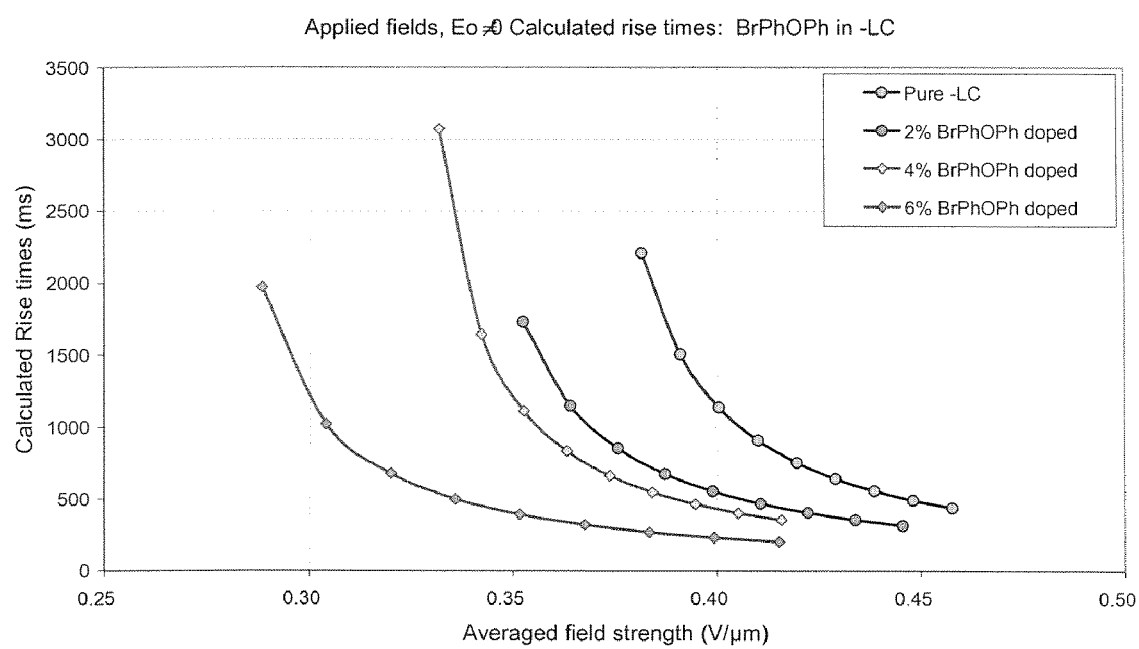
Figure 4:
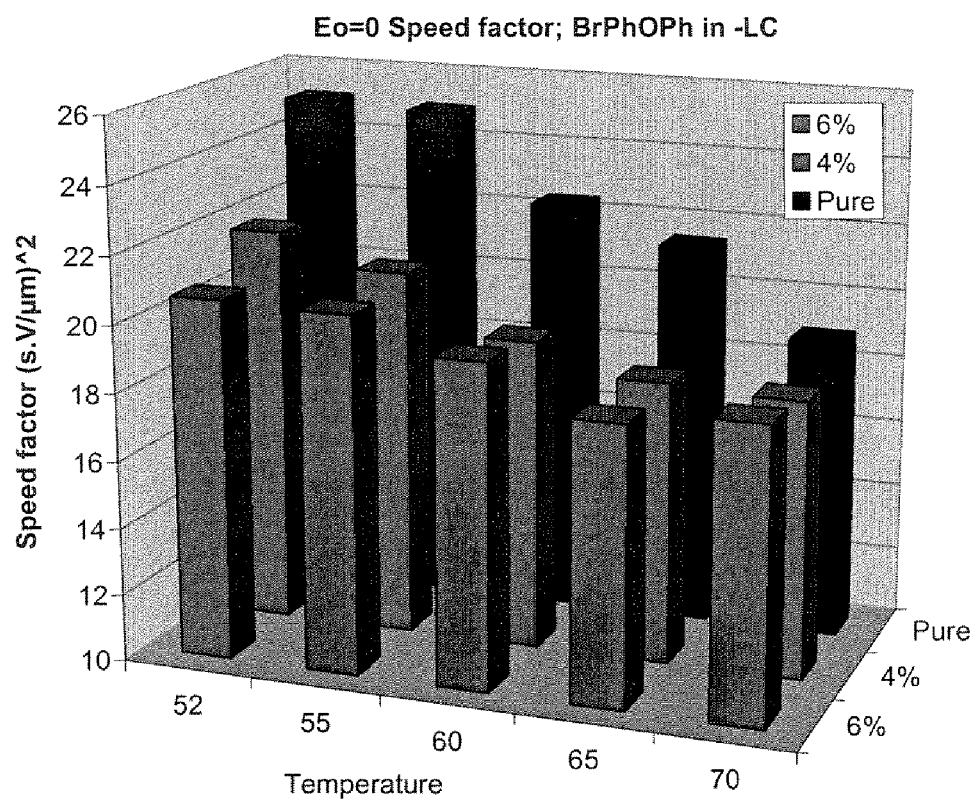
Figure 5:
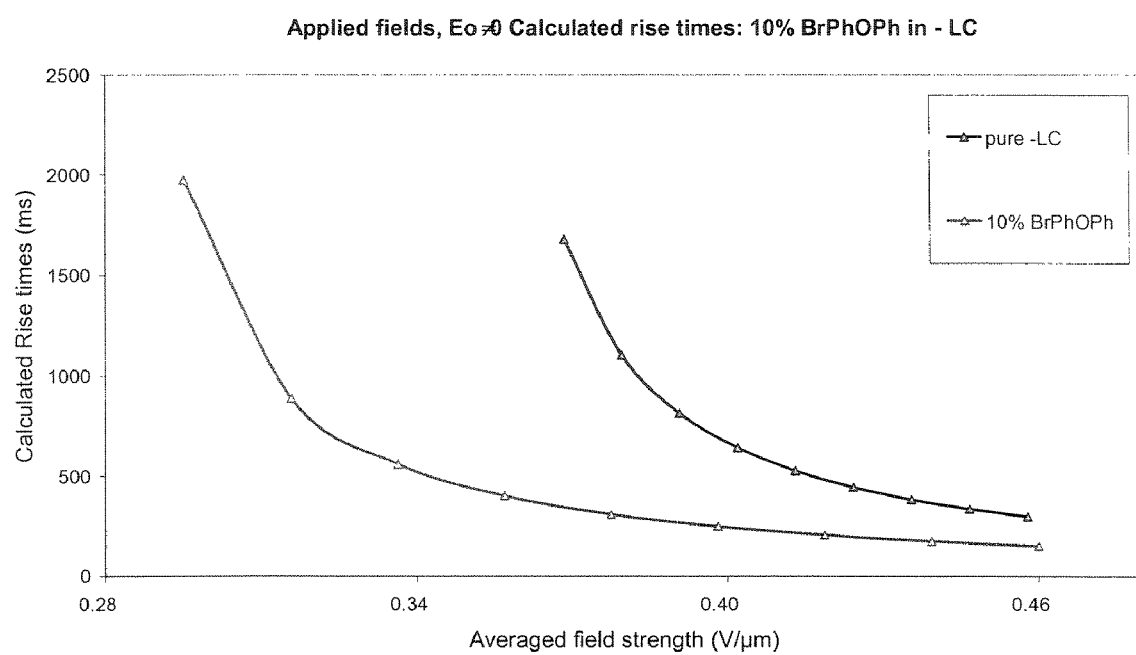
Figure 6:
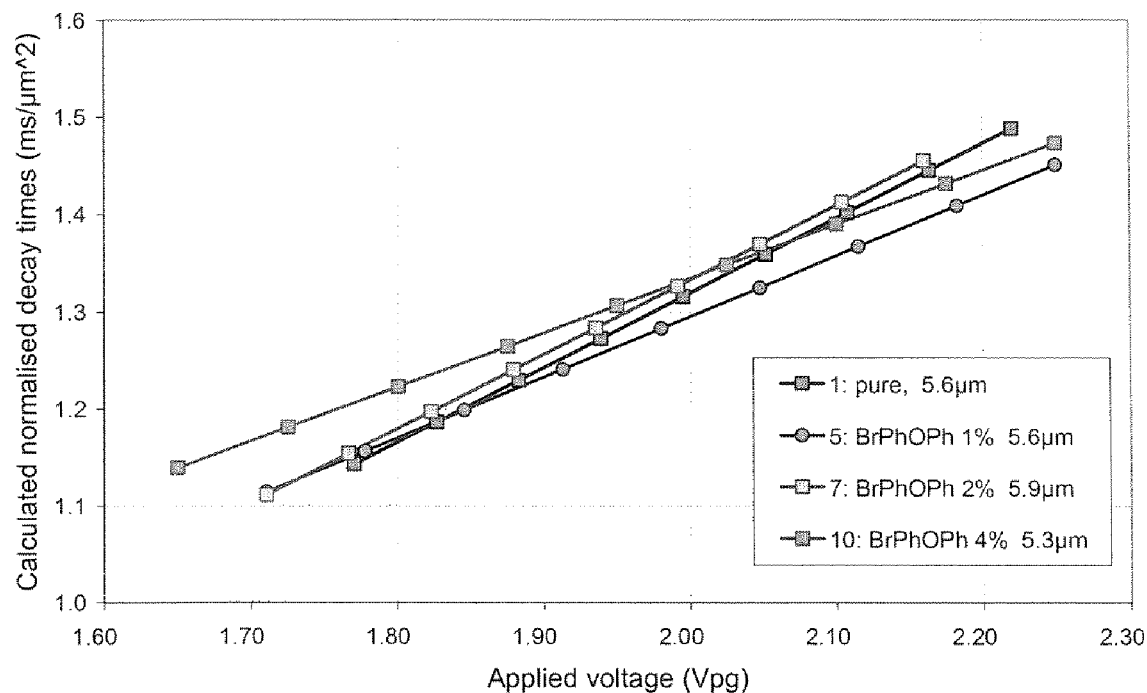
Figure 7:
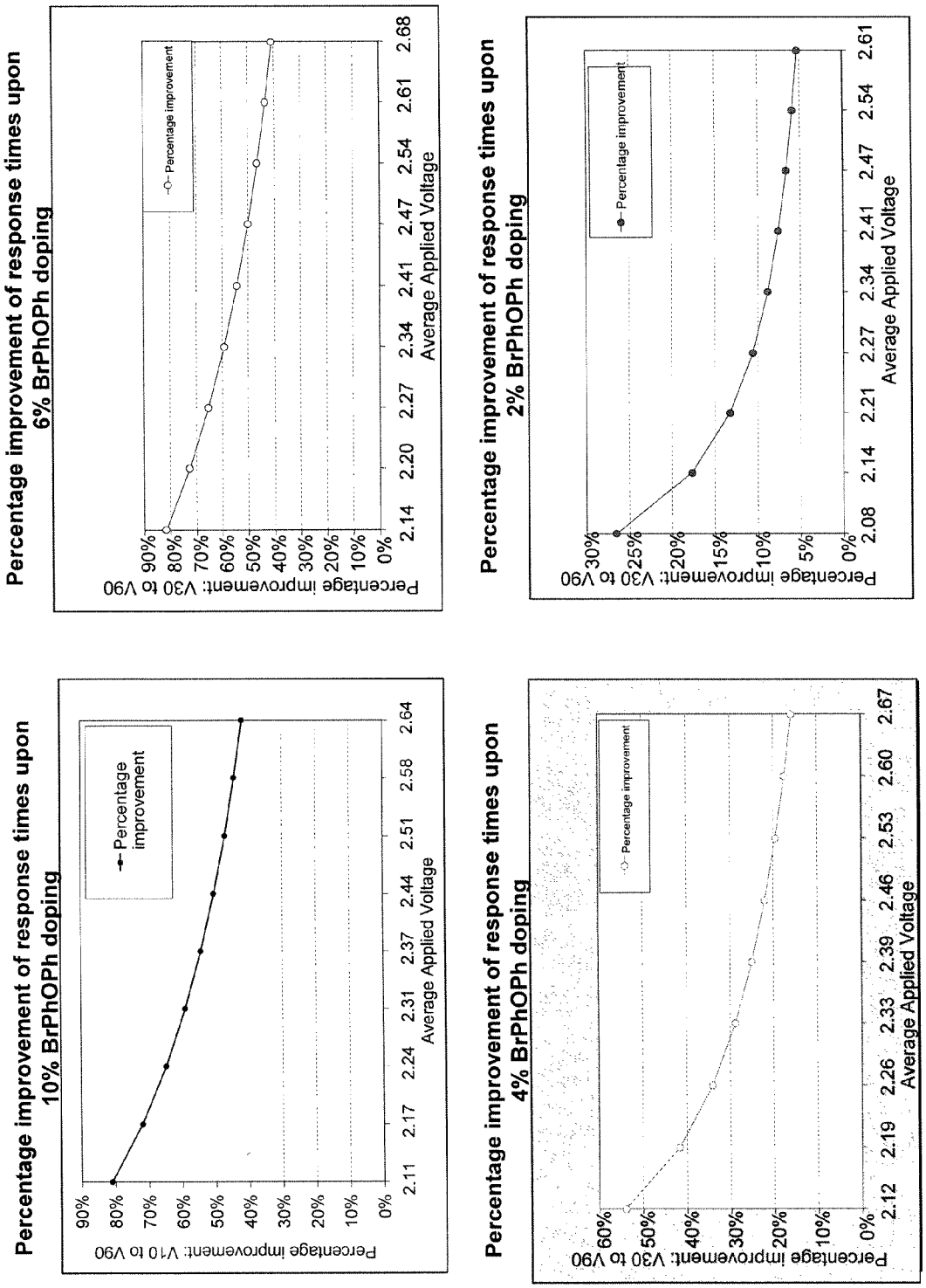

Results:

Mixing different concentrations of 4-bromodiphenylether with negative type liquid crystals result in faster response times (>4 ms without dopant, <3.5 ms with 4-bromodiphenylether), FIGS. 3 to 6. The overall response time improvements are up to >80% depending on the concentration of the diaromatic ether and the applied voltages, FIG. 7.

Figure 8:
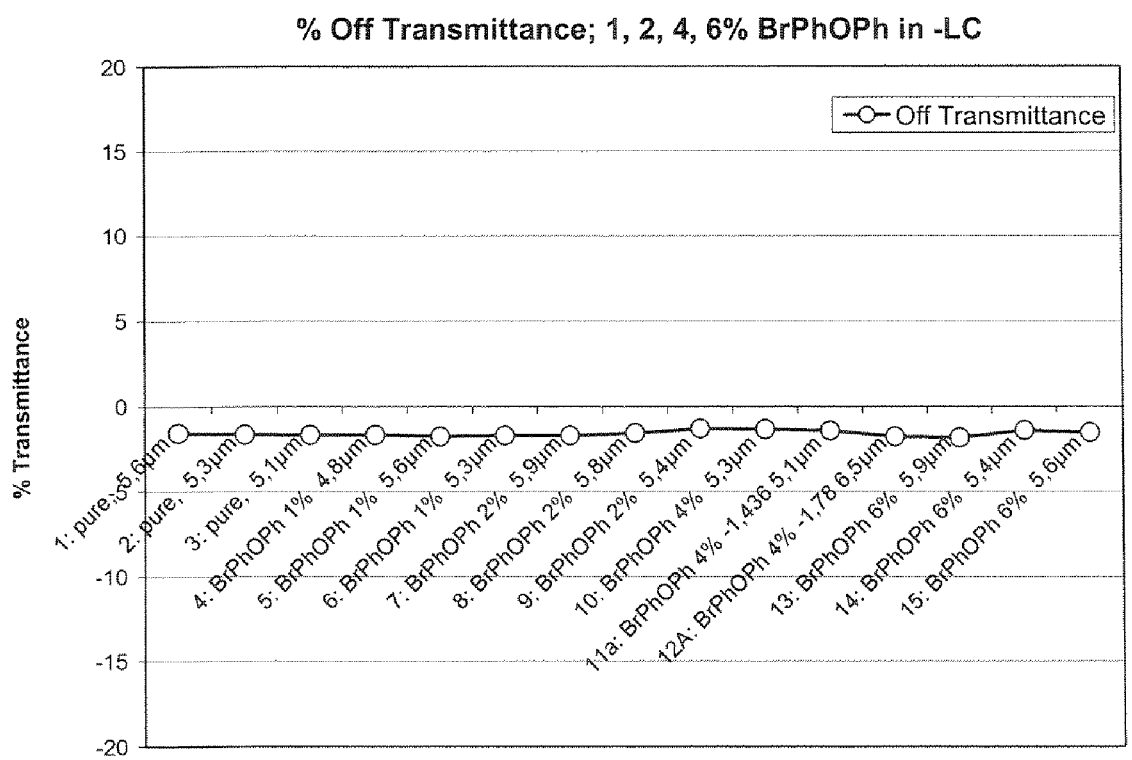
Figure 9:
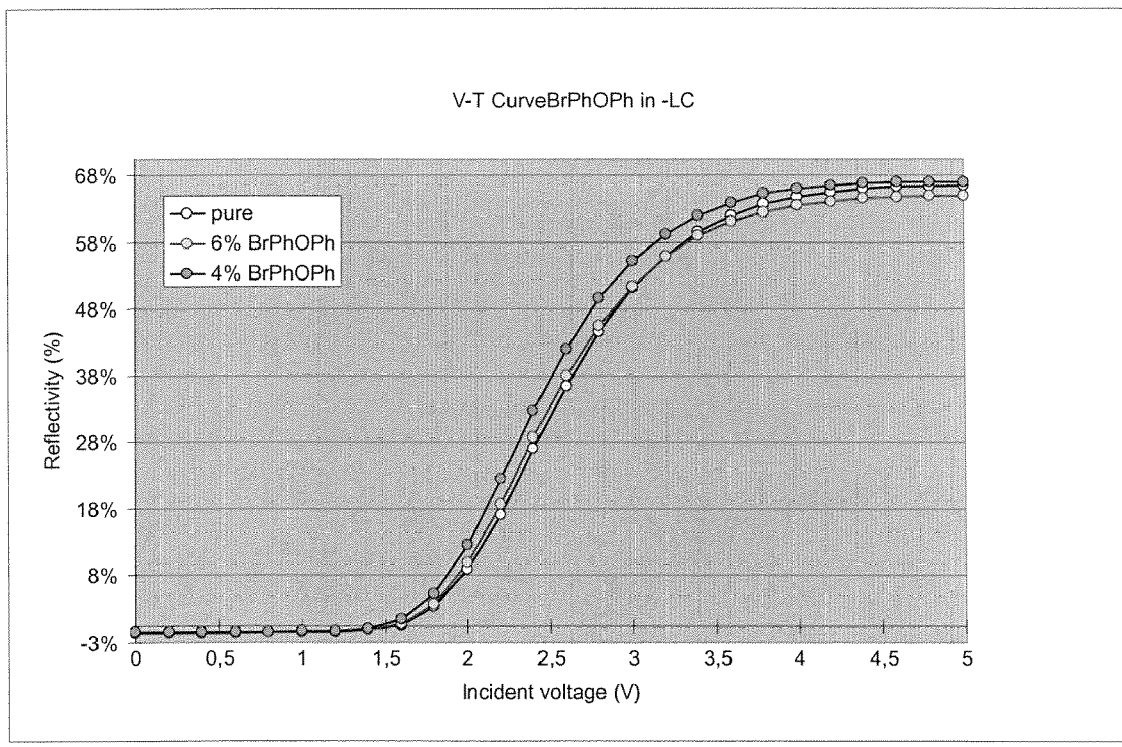
Figure 10:
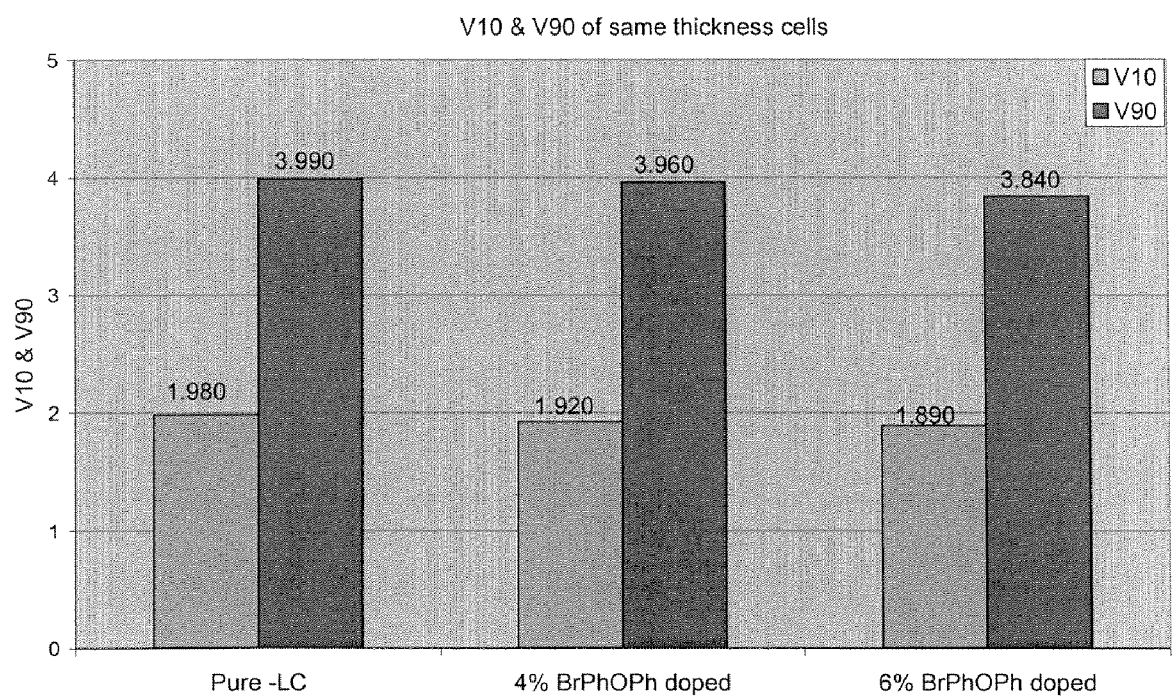
FIG. 10 shows V10 and V90 values of 4% and 6% BrPhOPh doped negative liquid crystal. 2 μm cells with $SiO_x$ alignment layer at 35° C. Switching voltages are reduced upon doping.
Figure 11:
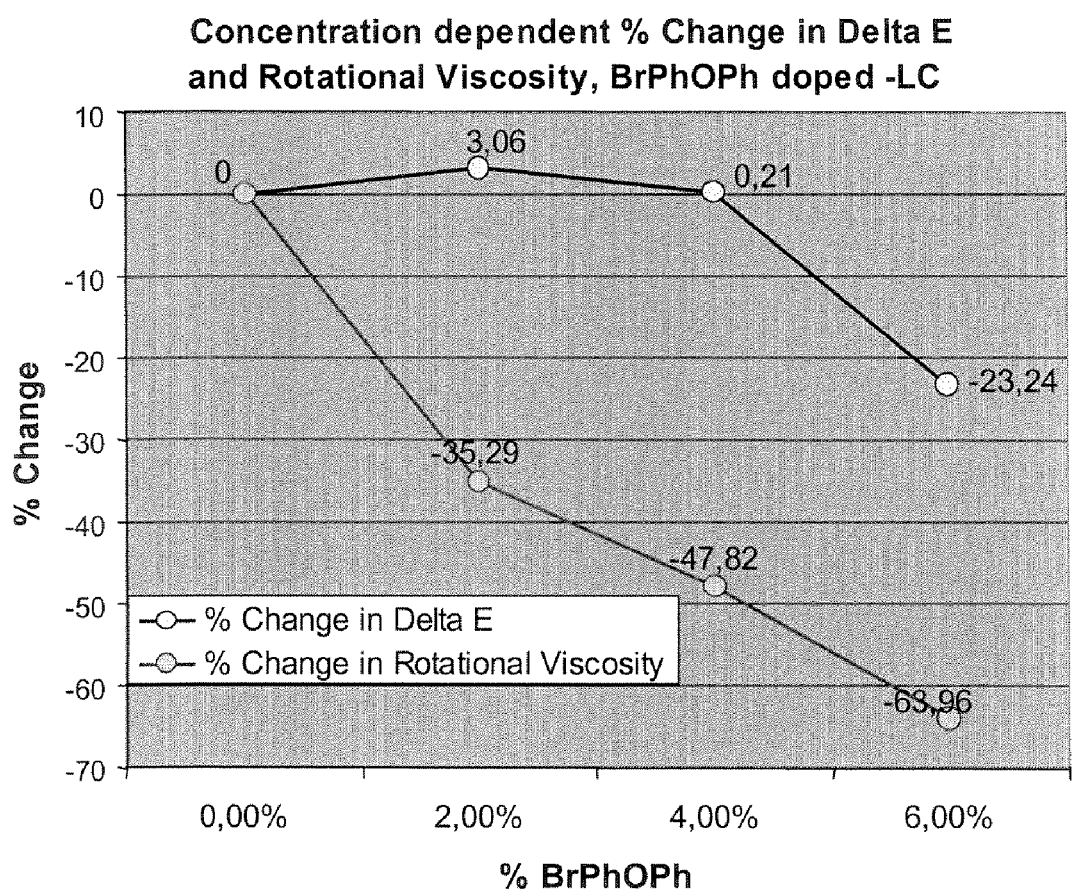
FIG. 11 shows Concentration dependent percentage changes in dielectric anisotropy and rotational viscosity of negative type liquid crystal upon addition of 2%, 4% and 6% of BrPhOPh. Measurements were carried out at 20° C.

The black level (off state transmittance) of the liquid crystals does not change upon addition of diaromatic ether, meaning no change in the liquid crystal alignment in the cells, FIGS. 8 and 9. Switching voltages of the BrPhOPh doped liquid crystals show a slight decrease, FIG. 10. The measured rotational viscosities and calculated dielectric anisotropy values (FIG. 11) are in very good agreement with the percentage improvement of the response times.

Voltage Holding ratios are all higher than 98%.

Example 2

1 to 6 weight % of 4-chlorodiphenylether was mixed with negative type liquid crystals and stirred at 60° C. for an hour. The mixtures were then filled by capillary action in 10 µm cell gap vertically aligned test cells. The filled test cells were annealed in an oven for 2 hours at 5° C.-10° C. lower temperatures than the nematic-isotropic transition temperatures of the liquid crystals. The test cells were allowed to cool gradually to room temperature 22° C. Then the response and transmittance profiles were measured at 35° C. using an optical microscope and drive and measurement hardware and software.

Results:

Mixing different concentrations of 4-chlorodiphenylether with negative type liquid crystals result in faster response times in comparison to that of the pure liquid crystal, FIG. 12-13. The overall response time improvements change between >5% to >50% depending on the concentration of the diaromatic ether and the applied voltages. The black level (off state transmittance) of the liquid crystals does not change upon addition of diaromatic ether, meaning no change in the liquid crystal alignment inside the cells.

Example 3

1 to 10 weight % of 4-bromo or 4-chloro diphenylether were mixed with positive type liquid crystals and stirred at 60° C. for an hour. The mixtures were then capillary filled in 5 µm cell gap, twisted nematic test cells. The filled test cells were annealed in an oven for 2 hours at 10° C. lower temperatures than the nematic-isotropic transition temperatures of the liquid crystals. The test cells were allowed to cool gradually to room temperature ~22° C. Then the response and transmittance profiles were measured at 35° C. using an optical microscope and drive and measurement hardware and software.

Finally, the mixtures were also filled in 10 µm cell gap twisted nematic and in 20 µm cell gap anti-parallel test cells. These test cells were used to measure the capacitance, dielectric anisotropy and rotational viscosities of the mixtures.

Results:

Mixing different concentrations of 4-bromo or 4-chlorodiphenylether with positive type liquid crystals also result in faster response times than the response of the pure liquid crystal, FIG. 14-16. The overall response time improvements change between >5% to >45% depending on the concentration of the diaromatic ether and the applied voltages. Voltage holding ratios of both BrPhOPh doped and ClPhOPh doped systems are very good, all being higher than 96%, FIGS. 17 and 18. Switching voltages reduce slightly upon doping with BrPhOPh, FIG. 19. The black level (off state transmittance) of the liquid crystals changes slightly upon addition of diaromatic ether as the order parameters show a slight decrease, FIG. 20.

Example 4

Moreover, a number of experiments were performed using D-SPDLCs and liquid crystal compositions according to the present inventions. All D-SPDLCs mentioned below were prepared and materials are used as described in EP 02 793 010.6 and in EP 0 279 1826.7. Commonly, in such D-SPDLCs, a hysteresis is observed, namely a shift of the transmission vs. voltage curve when the voltage is decreases in comparison to the transmission vs. voltage curve when the voltage is increased. More specifically, hysteresis is defined as ΔV at T$_{50}$, namely the difference between the voltage value at T$_{50}$ when a voltage is increased and the voltage value at T$_{50}$ when the voltage is decreased. T$_{50}$ is defined as ½ T$_{max}$ plus T$_{min}$. An addition of dopants in accordance with the present invention in the refilled D-SPDLC test cell showed a reduction in hysteresis, while other parameters (switching voltage, response times, contrast ratios etc.) are not greatly affected. The reduced hysteresis means that in addition of dopants in accordance with the present invention will help in increasing the D-SPDLC display's grey levels and the grey scale reproducibility.

a) BrPhOPh Reduces Hysteresis of D-SPDLC

Various concentrations of BrPhOPh were added to the refilling dichroic LC (3 wt % B4 B4 [a mixture of azo and anthraquinone dichroic dyes] dyed TL203), and the transmittance-voltage curve of the resulting D-SPDLC test cells were obtained. 250 Hz AC voltage was applied at each data point with a measurement delay after each of increment of voltage of 4 s prior to a measurement with an integration time of 1 second.

FIG. 21 shows that the hysteresis of undoped D-SPDLC (top) is suppressed by 5 wt % doping of BrPhOPh (bottom).

b) BrPhOPh & ClPhOPh Reduce Hysteresis of D-SPDLC

Reduction can be seen as the concentration of either BrPhOPh or ClPhOPh increase. Hysteresis reduction is more efficient with ClPhOPh compared to BrPhOPh (FIG. 22).

The features of the present invention disclosed in the specification, the claims and/or in the accompanying drawings, may, both separately, and in any combination thereof, be material for realizing the invention in various forms thereof.

The invention claimed is:

1. A composition comprising at least one liquid crystal and at least one of a diaromatic ether, a diaromatic thioether and a diaromatic secondary amine, of formula (I)

$$Ar_1—(CH_2)_l—X—(CH_2)_k—Ar_2 \quad (I)$$

wherein X is O, S or NH; each of $Ar_1$ and $Ar_2$ is an aromatic ring system; and l and k is each independently 0 to 10; wherein each of $Ar_1$ and $Ar_2$, independently, is an unsubstituted aromatic ring system or a substituted aromatic ring system having one or more substituents selected from the group consisting of Cl, F, Br, I, OH, $NH_2$, —O$(CH_2)_nCH_3$, —$(CH_2)_nCH_3$ wherein n is 0 to 22, —$CY_mH_{3-m}$ wherein Y is Cl, F, Br or I, and m is from 1 to 3, —CN, —COOH, a carboxylic acid ester, an unsubstituted cyclohexyl, a substituted cyclohexenyl, an unsubstituted cyclohexenyl, a substituted cyclopentadienyl, an unsubstituted cyclopentadienyl, a substituted cyclopentyl and an unsubstituted cyclopentyl.

2. The composition according to claim 1, wherein each of $Ar_1$ and $Ar_2$ is independently selected from the group consisting of phenyl, naphthyl, biphenyl, binaphthyl, anthracenyl, triptycyl, and a heteroaromatic ring with one or more of S, O and N.

3. The composition according to claim 1, wherein one of $Ar_1$ and $Ar_2$ is substituted with one or more substituents and the other one of $Ar_1$ and $Ar_2$ is not substituted.

4. The composition according to claim 3, wherein the composition comprises at least one diaromatic ether selected from the group consisting of 4-chlorodiphenylether, 4-bromodiphenylether and 4-fluorobiphenylether.

5. The composition according to claim 1, wherein both of $Ar_1$ and $Ar_2$ are substituted with one or several substituents.

6. The composition according to claim 1, wherein none of $Ar_1$ and $Ar_2$ are substituted.

7. The composition according to claim 1, wherein the amount of the diaromatic ether, the diaromatic thioether, or the diaromatic secondary amine is, with respect to the total weight of the composition, 0.05% (w/w) to 20% (w/w).

8. The composition according to claim 1, wherein the liquid crystal is a liquid crystalline compound or a mixture of liquid crystalline compounds possessing negative dielectric anisotropy.

9. The composition according to claim 1, wherein, the liquid crystal is a liquid crystalline compound or a mixture of liquid crystalline compounds possessing positive dielectric anisotropy.

10. The composition according to claim 1, wherein the liquid crystal is a dual-frequency liquid crystalline compound or a mixture of dual-frequency liquid crystalline compounds.

11. The composition according to claim 1, wherein the liquid crystal is a liquid crystalline compound or a mixture of liquid crystalline and non-liquid crystalline compounds where the liquid crystalline compound is one or more nematic liquid crystals.

12. A liquid crystal cell comprising the composition according to claim 1.

13. The liquid crystal cell according to claim 12, comprising a front- and a backplane, on each or either of said front- and backplane an electrode or multiplicity of electrodes, on each of said electrodes and/or on said front- and backplane, a boundary surface consisting of either the electrode and/or the front- and backplane, or consisting of an additional layer or layers of materials on said electrode and/or on said front- and backplane, and between said boundary surfaces.

14. The liquid crystal cell according to claim 12 having a response time of <40 ms, and/or a voltage holding ratio of >80%.

15. The liquid crystal cell according to claim 12, which is prepared from the composition and is at least one of a polymer dispersed liquid crystal (PDLC), a dichroic polymer dispersed liquid crystal (D-PDLC), a sponge polymer dispersed liquid crystal (SPDLC), and a dichroic sponge polymer dispersed liquid crystal cell (D-SPDLC).

16. The liquid crystal cell according to claim 15, having a hysteresis $\Delta V < 0.1 \times V_{90}$, wherein $V_{90}$ is a switching voltage at which $T_{90}$, i.e. 90% of maximum transmission, is achieved, wherein the hysteresis $\Delta V$ is defined as the difference in voltage between the voltage value at half maximum transmission, $T_{50}$, of said cell when the voltage is increasing and the voltage value at half maximum transmission, $T_{50}$, of said cell when the voltage is decreasing, on a transmission vs. voltage graph, wherein $T_{50}$ is defined as $\frac{1}{2}(T_{max}+T_{min})$, wherein $T_{max}$ and $T_{min}$ are the maximum and minimum transmission achieved on said transmission vs. voltage graph.

17. A liquid crystal display device, comprising the composition according to claim 1.

18. A method of preparing the composition according to claim 1, comprising:
mixing at least one of the diaromatic ether, the diaromatic thioether, and the diaromatic secondary amine with at least one of the liquid crystals.

19. A method of preparing the liquid crystal cell according to claim 12, comprising:
filling a liquid crystal cell, a D-SPDLC, a SPDLC, a D-PDLC, or a PDLC with the composition.

20. The composition according to claim 1, wherein one of $Ar_1$ and $Ar_2$ is substituted with one or more substituents and the other one of $Ar_1$ and $Ar_2$ is not substituted.

21. The composition according to claim 2, wherein both of $Ar_1$ and $Ar_2$ are substituted with one or several substituents.

22. The composition according to claim 2, wherein none of $Ar_1$ and $Ar_2$ are substituted.

23. The composition according to claim 1, wherein the amount of the diaromatic ether, the diaromatic thioether, or the diaromatic secondary amine is, with respect to the total weight of the composition 0.1% (w/w) to 10% (w/w).

24. A liquid crystal display device, comprising one or more of the interconnected or separate liquid crystal cells according to claim 12.

25. The composition of claim 1, comprising at least one of the diaromatic thioether and the diaromatic secondary amine.

26. The composition according to claim 1, wherein each of l and k is 0.

27. The composition according to claim 1, wherein X is S or NH.

28. The composition according to claim 1, wherein each of $Ar_1$ and $Ar_2$, independently, is a substituted aromatic ring system having one or more substituents selected from the group consisting of Cl, F, Br, I, OH, $NH_2$, $—O(CH_2)_nCH_3$, $—(CH_2)_nCH_3$ wherein n is 0 to 22, $—CY_mH_{3-m}$ wherein Y is Cl, F, Br or I, and m is from 1 to 3, —CN, —COOH, a carboxylic acid ester, a substituted cyclohexenyl, an unsubstituted cyclohexenyl, a substituted cyclopentadienyl, an unsubstituted cyclopentadienyl, a substituted cyclopentyl and an unsubstituted cyclopentyl.

* * * * *